United States Patent
Hara et al.

(10) Patent No.: US 10,678,442 B2
(45) Date of Patent: *Jun. 9, 2020

(54) DISK DRIVE THAT EFFICIENTLY HANDLES RANDOM MIXED-R/W COMMAND-STREAMS

(71) Applicant: KABUSHIKI KAISHA TOSHIBA, Tokyo (JP)

(72) Inventors: Takeyori Hara, Kawasaki Kanagawa (JP); Richard M. Ehrlich, Saratoga, CA (US); Siri S. Weerasooriya, Campbell, CA (US)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/262,829

(22) Filed: Jan. 30, 2019

(65) Prior Publication Data

US 2019/0163368 A1    May 30, 2019

Related U.S. Application Data

(63) Continuation of application No. 15/455,036, filed on Mar. 9, 2017, now Pat. No. 10,198,188.

(51) Int. Cl.
*G06F 3/06* (2006.01)

(52) U.S. Cl.
CPC ............ *G06F 3/061* (2013.01); *G06F 3/0613* (2013.01); *G06F 3/0659* (2013.01); *G06F 3/0676* (2013.01)

(58) Field of Classification Search
CPC ...... G06F 3/061; G06F 3/0613; G06F 3/0659; G06F 3/0676
See application file for complete search history.

(56) References Cited

U.S. PATENT DOCUMENTS

| | | |
|---|---|---|
| 5,426,739 A | 6/1995 | Lin et al. |
| 6,301,639 B1 | 10/2001 | Cleavinger et al. |
| 6,721,906 B1 | 4/2004 | Hirashita et al. |
| 6,826,630 B2 | 11/2004 | Olds et al. |
| 6,925,539 B2 | 8/2005 | Mowery et al. |
| 2004/0019745 A1* | 1/2004 | Espeseth ............... G06F 3/0613 711/137 |
| 2010/0205371 A1* | 8/2010 | Tanaka .................. G06F 3/0605 711/114 |
| 2010/0262730 A1* | 10/2010 | Jibbe ..................... G06F 3/0613 710/40 |
| 2014/0298058 A1 | 10/2014 | Klingauf et al. |
| 2016/0378365 A1 | 12/2016 | Shih et al. |

* cited by examiner

*Primary Examiner* — Aracelis Ruiz
(74) *Attorney, Agent, or Firm* — Kim & Stewart LLP

(57) ABSTRACT

Aspects of the present disclosure generally relate to storage devices and methods of operating the same. In one aspect, a storage device includes a disk, and a head configured to write data to and read data from the disk. The storage device also includes a controller configured to receive a read command in a host command queue, store the read command in a disk queue, and determine whether the host command queue is full of pending read commands, including the received read command. If the host command queue is full of pending read commands, the controller forces execution of one of the pending read commands.

12 Claims, 4 Drawing Sheets

21

| INDEX | START LBA | LENGTH | READ/WRITE |
|---|---|---|---|
| 1 | L000235 | 100 KB | READ |
| 2 | L000056 | 200 KB | WRITE |
| 3 | L000016 | 1 MB | READ |
| 4 | L000287 | 20 MB | READ |
| 5 | L000123 | 400 KB | WRITE |
| 6 | L000222 | 3 MB | WRITE |
| 7 | L000151 | 200 KB | READ |
| 8 | L000321 | 10 KB | READ |
| ⋮ | ⋮ | ⋮ | ⋮ |
| n | L003240 | 50 KB | WRITE |
|  |  |  |  |
|  |  |  |  |

| INDEX | START LBA | LENGTH | READ/WRITE |
|---|---|---|---|
| 1 | L000235 | 100 KB | READ |
| 2 |  |  |  |
| 3 | L000016 | 1 MB | READ |
| 4 | L000287 | 20 MB | READ |
| 5 |  |  |  |
| 6 |  |  |  |
| 7 | L000151 | 200 KB | READ |
| 8 | L000321 | 10 KB | READ |

FIG. 5

DISK DRIVE THAT EFFICIENTLY HANDLES RANDOM MIXED-R/W COMMAND-STREAMS

This application is a continuation of U.S. patent application Ser. No. 15/455,036, filed Mar. 9, 2017, now U.S. Pat. No. 10,198,188, issued Feb. 5, 2019, the entire contents of which are incorporated herein by reference.

BACKGROUND

A hard disk drive (HDD) is a data storage device that uses magnetic storage to store and retrieve digital information. An HDD receives commands from a host, such as a computer, to either store information (e.g., a write command) or to retrieve information (e.g., a read command). HDDs allow multiple commands to be received from the host and then queued to allow more efficient execution of the received commands. Information relating to the queued commands is stored in a host command queue, which has a limited size, until completed by the HDD. Once the host command queue is filled, the host is no longer able to provide commands to the HDD until a command residing in the host command queue is completed. Even if the host command queue is not actually full, the host command queue may be "effectively full", that is, the host may not be willing to leave more than a certain number of commands outstanding. The HDD's inability to accept or the host's unwillingness to send further commands reduces device performance. Therefore, there is a need for a method and apparatus for mitigating reduced performance in the event of a full host command queue.

SUMMARY

In one aspect, a storage device includes a disk, and a head configured to write data to and read data from the disk. The storage device also includes a controller configured to receive a read command in a host command queue, store the read command in a disk queue, and determine whether the host command queue is full of pending read commands, including the received read command. If the host command queue is full of pending read commands, the controller forces execution of one of the pending read commands In another aspect, a method of operating a storage device includes receiving a read command in a host command queue. The read command is stored in a disk queue. A determination is made as to whether the host command queue is full of pending read commands, including the received read command. If the host command queue is full of pending read commands, execution of one of the pending read commands is forced. Disk drives including controllers implementing similar methods are also disclosed.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

FIG. 4 illustrates an example of a disk queue, according to one embodiment of the disclosure.

FIG. 5 illustrates an example of a host command queue, according to one embodiment of the disclosure.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
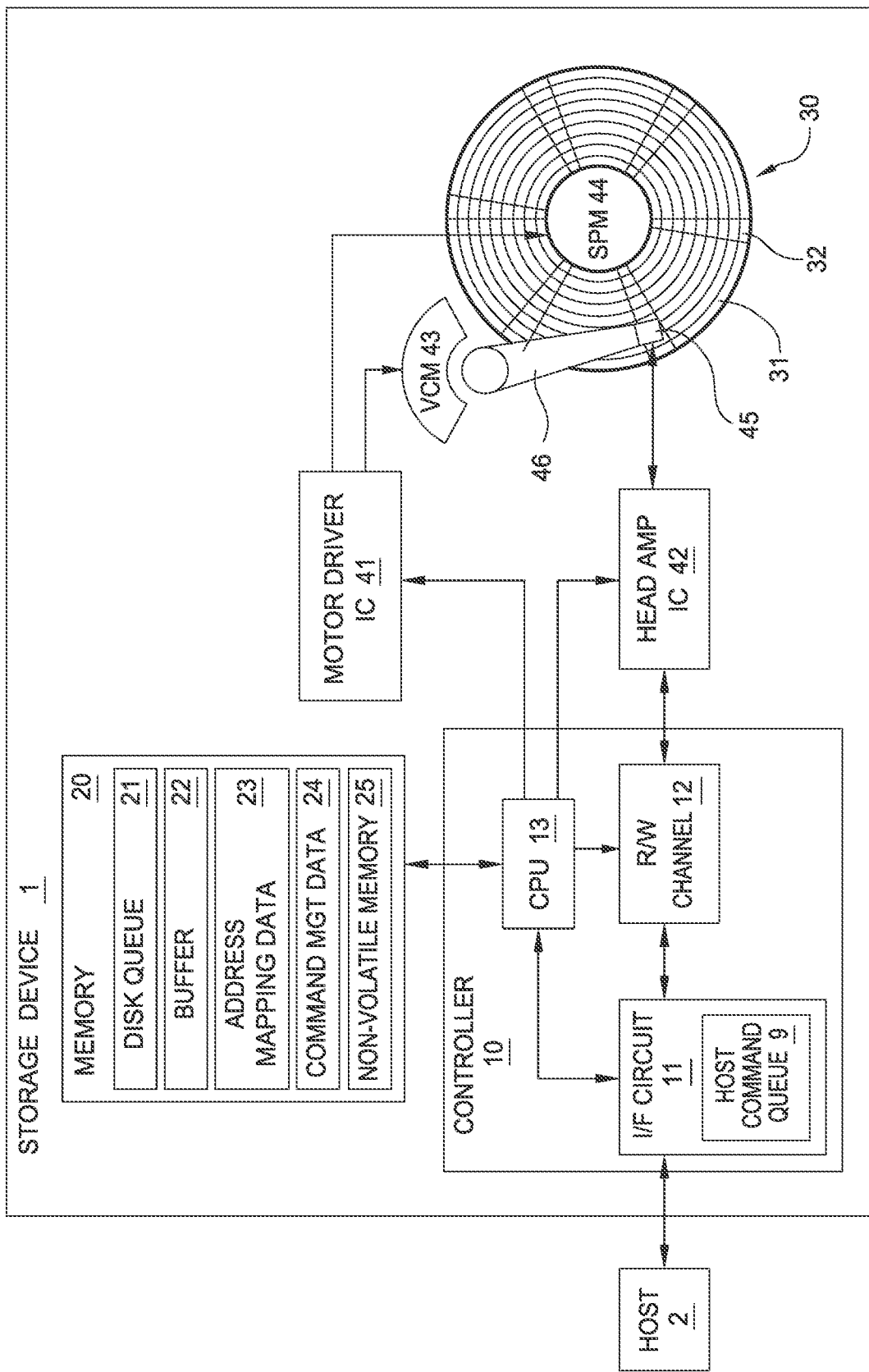
FIG. 1 is a schematic view of a storage system including a host and a storage device according to an embodiment of the disclosure.

FIG. 1 illustrates a configuration of a storage system including a storage device 1 according to an embodiment, and a host 2 connected to the storage device 1. The storage device 1 receives commands, such as write commands and read commands, from the host 2 and executes the received commands. The storage device 1 may be connected externally to the host 2 or may be embedded in the host 2. The host 2 may be any computing device that uses the storage device 1 as data storage, and for example, a personal computer, a mobile wireless communication device, a gaming device, an imaging device, or a server computer, and so on.

The storage device 1 includes, but is not limited to, a controller 10, a memory 20, a magnetic disk 30, a motor driver IC 41, a head amp IC 42, a voice coil motor (VCM) 43, a spindle motor (SPM) 44, a head 45, and an arm 46.

The controller 10 includes an interface (I/F) circuit 11, a read/write (R/W) channel 12, and a CPU 13. The I/F circuit 11 serves as an interface between the storage device 1 and the host 2, and receives data and commands from the host 2 and transmits data and notifications to the host 2. The data and commands received from the host are stored in a host command queue 9. The received commands are stored in the host command queue 9 until the host 2 is informed that a respective command has been executed (e.g., completed). A host 2 may be informed of execution of a command by receiving read data in the instance of a read command, or by receiving a write acknowledgement (WR_ACK) in the instance of a write command.

In one example, the I/F circuit 11 is capable of converting a data format of data received from the host 2 so that the data are compatible with the storage device 1. The I/F circuit 11 is also capable of converting a data format of data to be transmitted to the host 2 so that the data are compatible with the host 2. The I/F circuit 11 may employ any interface standard, for example, Parallel ATA (PATA), Serial ATA (SATA), Small Computer System Interface (SCSI), Serial Attached Small Computer System Interface (SAS), or Peripheral Component Interconnect Express (PCIe).

The R/W channel 12 is a signal processing circuit that carries out signal processing, such as D/A conversion, encoding, A/D conversion, or multiplexing. For example, the R/W channel 12 encodes data to be written into the magnetic disk 30 (i.e., write data) and outputs the encoded data to the head amp IC 42 for writing to the magnetic disk 30. Also, the R/W channel 12 decodes data read from the magnetic disk 30 (i.e., read data) and outputs the decoded data to the I/F circuit 11 for transmission to the host 2.

The CPU 13 is a main controller of the storage device 1 and carries out various operations in accordance with program data or firmware. In particular, the CPU 13 controls the motor driver IC 41 to drive the VCM 43 in order to move the head 45 to a particular position and to drive the SPM 44 in order to rotate the magnetic disk 30. Also, the CPU 13 controls the head amp IC 42 to output data to the head 45 for writing and amplifying data received from the head 45. The program data or firmware may be stored in an internal memory of the CPU 13 or loaded thereto from a memory external to the CPU 13, such as the memory 20 and the magnetic disk 30 or a memory or a non-transitory computer readable medium external to the storage device 1.

The memory 20 may store data in a volatile or nonvolatile manner. Typically, the memory 20 is a volatile random access memory such as DRAM and SRAM. In the memory 20, program data or firmware executed by the CPU 13 or other data that are temporarily used in the storage device 1 may be stored. In addition, a disk queue 21, a buffer 22, an address mapping data 23, and a command management data 24 are stored in the memory 20. Although the disk queue 21, the buffer 22, the address mapping data 23, and the command management data 24 are stored in the memory 20, a memory that stores each or some of these elements may be physically separated from each other. For example, the buffer 22 may be formed in a memory physically separated from a memory that stores the disk queue 21, the address mapping data 23, and the command management data 24. In this case, the disk queue 21, the address mapping data 23, and the command management data 24 may be stored with a volatile memory, and the buffer 22 may be stored with a nonvolatile memory, or vice versa.

The disk queue 21 is a storage region in which commands received from the host command queue 9 are stored while awaiting execution. In one example, read and write commands received from the host command queue 9 may be stored in the disk queue 21 to facilitate efficient read/write reordering. In such an example, when the storage device 1 is able to cache write data received from the host 2 (or is otherwise able to protect data against power loss), a write acknowledgment may be provided to the host 2 upon transfer of the write command to the disk queue 21 and the associated write data to the buffer 21. The memory 20 may include a non-volatile memory 25 to which write data is written in the event of power loss. If the memory 20 includes a non-volatile memory 25, then the write-command can be completed after the data has been transferred to (volatile) memory. Even if the memory does not include a non-volatile memory 25, if the host 2 has enabled write-caching in the storage device 1, then the write command can be completed after the data has been transferred to memory. Upon transfer of the write acknowledgement, the command is removed from the host command queue 9, leaving a vacancy in the host command queue 9, although the write command is pending in the disk queue 21 awaiting execution according to a read/write reordering scheme of the storage disk 1. In contrast, read commands transferred from the host command queue 9 to the disk queue 21 require execution and return of read data to the host 2 before removal of the read command from the host command queue 9. Thus, read commands generally remain in the host command queue 9 longer than write commands.

The buffer 22 is a storage region in which data (e.g., write data) received from the host 2 through the I/F circuit 11 are temporarily stored before being written in the magnetic disk 30. That is, the buffer 22 serves as a write buffer of the storage device 1. In addition, the buffer 22 may serve as a read buffer for temporarily storing data (e.g., read data) read from the magnetic disk 30 before being transmitted to the host 2. Each time write data associated with a new command are received from the host 2 through the I/F circuit 11, the CPU 13 stores the write data in the buffer 22. The write data may be transmitted from the host 2 together with a command or separately from the command.

The address mapping data 23 are data indicating a correspondence between a logical address, which is used by the host 2 to identify a logical location of data, and a physical position of the magnetic disk 30. The command management data 24 are management data used by the CPU 13 to determine an order of commands to be executed. Each time a new command is queued in the disk queue 21, the CPU 13 updates the command management data 24. With reference to the command management data 24, the CPU 13 carries out an operation of determining a candidate command group from which a command to be executed next is selected.

The magnetic disk 30 includes a plurality of tracks formed along a circumferential direction of the magnetic disk 30. The tracks may be formed in a concentric manner or a spiral manner. Further, the magnetic disk 30 includes a plurality of data areas 31 that are formed between adjacent servo areas 32 and arranged along radial directions of the magnetic disk 30. That is, each track includes a plurality of data areas 31 and a plurality of servo areas 32. Each of the data areas 31 corresponds to a sector, a fraction of a sector, or a (possibly non-integer) number of sectors. Each of the servo areas 32 pre-stores address information indicating a track number and a servo wedge number. Based on the address information read from the servo areas 32 by the head 45, the CPU 13 can control a position of the head 45 at a particular position.

The motor driver IC 41 supplies power to the VCM 43 to drive the VCM 43. The VCM 43 moves the arm 46 and the head 45 disposed on a tip end of the arm 46. Also, the motor drive IC 41 supplies power to the SPM 44 to rotate the SPM 44. In accordance with rotation of the SPM 44, the magnetic disk 30 rotates, and the head 45 can write data to and read data from the magnetic disk 30.

The head amp IC 42 supplies a signal (current) corresponding to write data that are to be written to the head 45, and amplifies a signal corresponding to read data that are read from the head 45 and transmits the amplified signal to the controller 10 for further processing thereby. The head 45 includes a write head (not shown) configured to write data in the data areas 31 of the magnetic disk 30 and a read head (not shown) configured to read data from the data areas 31 and the servo areas 32 of the magnetic disk 30. The write head and the read head are disposed so as to be along a circumferential direction of the magnetic disk 30.

According to the present embodiment, the controller 10 (in particular, the CPU 13) of the storage device 1 executes commands not necessarily in a first-in first-out (FIFO) manner, that is, not necessarily in an order in which commands are stored in the disk queue 21. Commands may not necessarily be executed in a FIFO manner because corresponding physical positions of the magnetic disk to be accessed may be random and it may take a significant amount of time to move the head 45 and reach the tracks and sectors to be accessed. Instead, the controller 10 according to the present embodiment reorders the commands to be executed such that it takes less time to move the head 45 and seek the tracks and sectors, and thus, a more efficient access is carried out. Such a reordering of commands may be generally referred to as a "read/write reordering scheme" herein. In one example, the controller 10 carries out this command reordering when the number of commands queued in the disk queue 21 is sufficiently large, although reordering may occur with any number of commands in the disk queue 21.

Figure 2:
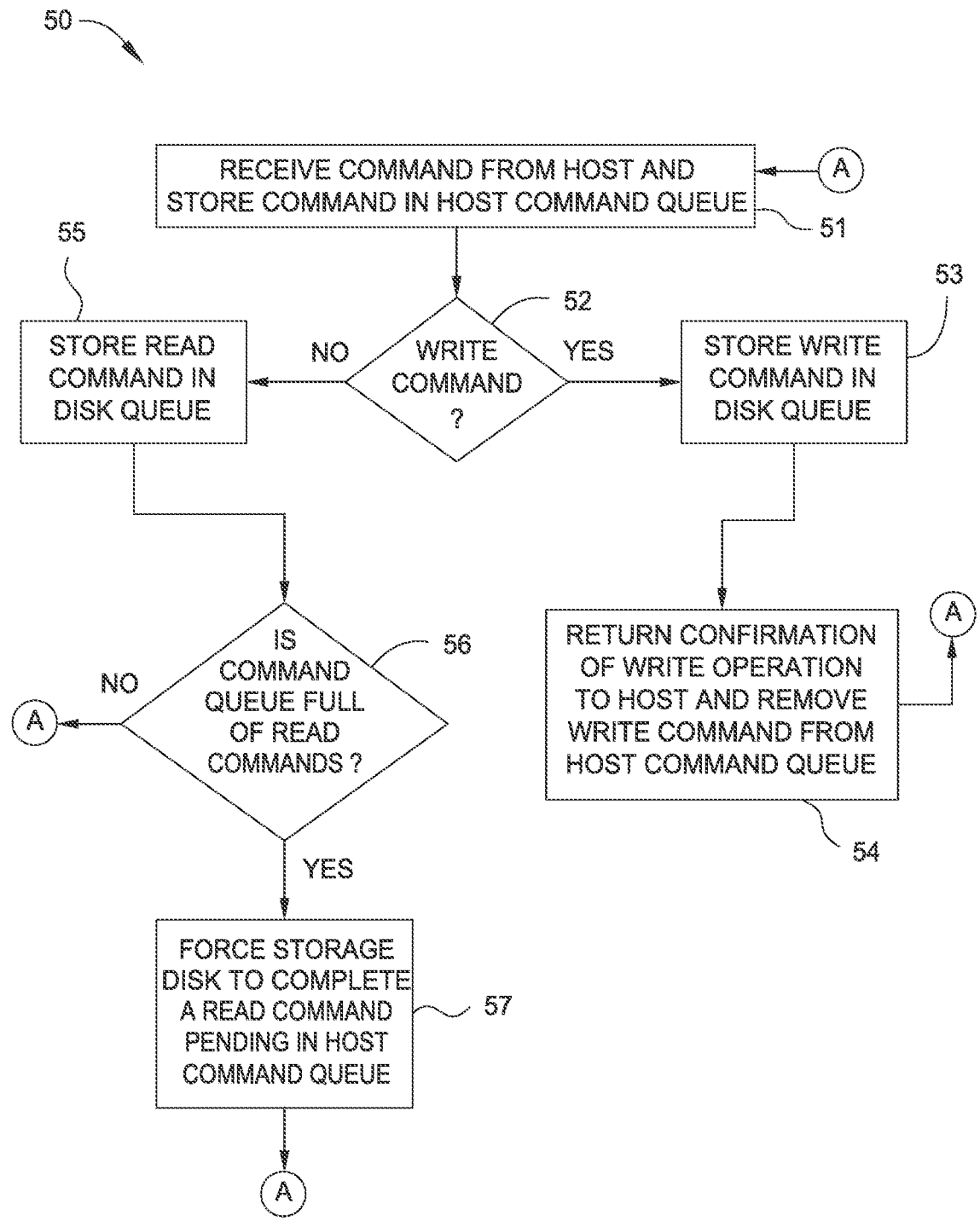
FIG. 2 is a flow diagram of method for operating a hard disk drive, according to one embodiment of the disclosure.

FIG. 2 is a flow diagram of method 50 for operating a storage device (e.g., storage device 1 of FIG. 1), according to one embodiment. To facilitate explanation of method 50, FIG. 2 will be explained in conjunction with FIG. 1. However, it is contemplated that the method 50 is applicable to other storage devices.

The method 50 begins at operation 51. In operation 51, a storage device, such as the storage device 1, receives a read/write command from a host 2. The command received from the host 2 is stored in a host command queue 9. Upon receipt of the command, method 50 proceeds to operation 52, and the controller 10 makes a determination as to whether the received command is a read command or a write command. If the controller 10 determines that the received command is a write command, method 50 proceeds to operation 53. In operation 53, the write command is stored in the disk queue 21. Once the write command is stored in a disk queue 21, and the associated data for the write command has been transferred to the buffer 22, the method 50 proceeds to operation 54.

In operation 54, if write-caching is enabled on the storage device 1 (or if the storage device 1 is otherwise able to protect write data against unexpected power loss), a confirmation of the write operation is returned to the host 2. If one of these conditions is met, a confirmation to the host 2 allows the corresponding write command to be removed from the host command queue 9, thereby freeing up one of the limited number of slots in the host command queue 9. In such an example, the write command remains pending in the disk queue 21 until the write command is executed on the storage disk (i.e., the data was written to its correct location at the magnetic disk 30). Pendency in the disk queue 21 allows the write command to be completed in a more efficient manner according to a read/write reordering scheme of the storage device 1, and additionally clears up space in the host command queue 9 for receiving additional commands from the host 2.

After completion of operation 54, the method 50 may return to operation 51, ready to accept another command. Because a confirmation was returned to the host 2 in operation 54, and a corresponding command was removed from the host command queue 9, at least one position is available in the host command queue 9 for receiving another command form the host 2. The continued receipt of commands in the command queue 9 results in more commands in the disk queue 21, as described above, and thus, facilitates more efficient read/write reordering. During at least operations 51-54, the storage device 1 continues to process commands from the disk queue 21 according to the read/write reordering scheme of the storage device 1. Thus, read/write commands are transferred to, and removed from, the disk queue 21 concurrently with processing (e.g., receiving and/or removing) of read/write commands at the host queue 9.

Returning to operation 52, if a determination is made that the command received from the host 2 is not a write command, but a read command, method 50 proceeds to operation 55. To clarify, if the data to be read is in the buffer (e.g., buffer 22 of FIG. 1), one of ordinary skill would understand that the following steps are not necessary since the data can be returned from the buffer. However if the data is not in the buffer, the process proceeds to operation 55. In operation 55, the read command is stored to the disk queue 21, and is eventually processed according to the read/write reordering scheme of the storage device 1. However, until the read command is processed from the disk queue 21 (e.g., the read data is retrieved from the correction location on the storage disk and is returned to the host 2), the read command remains outstanding in both the host command queue 9 and the disk queue 21. Pendency of the read command in the host command queue 9 occupies one of a limited number of spaces in the host command queue 9, preventing another host command from occupying that location in the host command queue 9 until execution of the read command. As described previously, the read command pending in the disk 21 may not necessarily be executed in a FIFO manner, and thus, may remain pending in the command queue 21 for a relatively longer period of time, e.g., until the read command is executed according to a particular read/write reordering scheme of the storage device 1. For reference, the disk queue 21 is generally many times larger than the host command queue 9.

Figure 3:
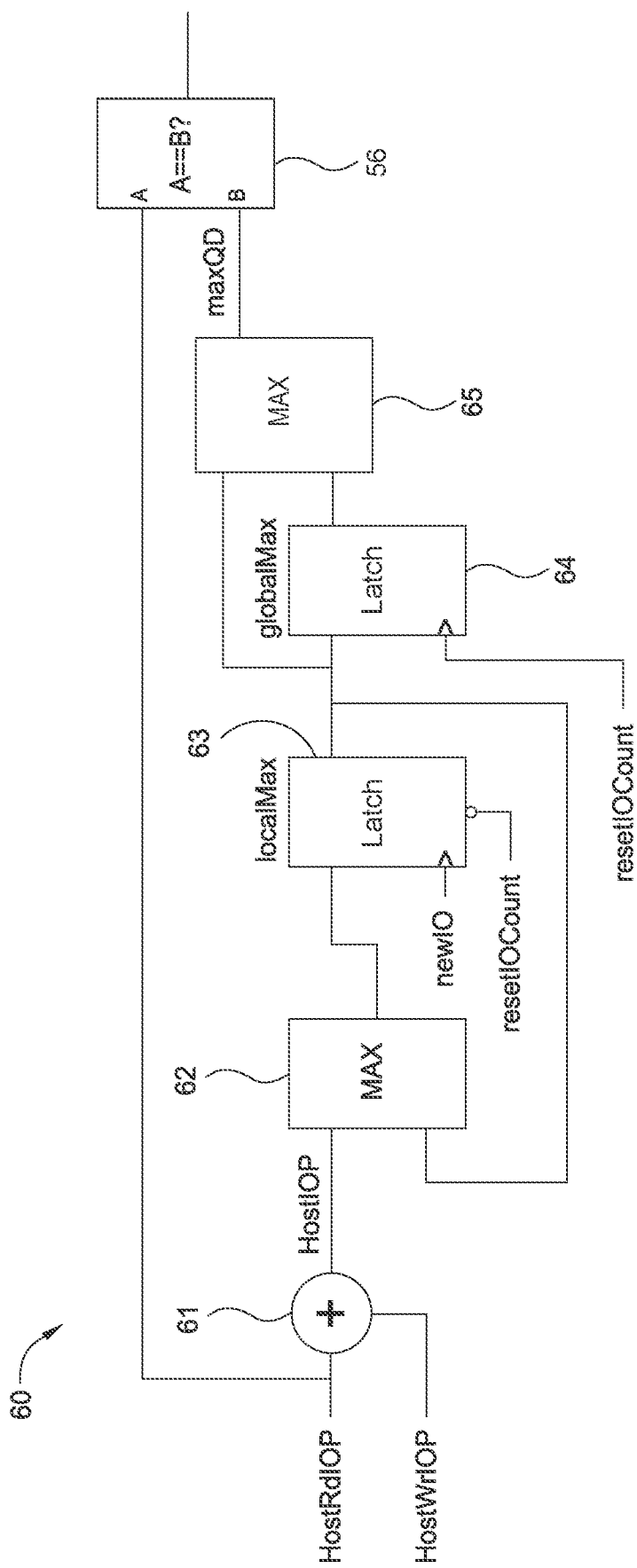
FIG. 3 is a diagram illustrating determination of host queue status, according to one embodiment of the disclosure.

In operation 56, the controller 10 makes a determination as to whether the host command queue 9 is full of read commands. The determination of operation 56 may include determining the lesser of (1) a limit of queue entries imposed by the storage device and (2) a limit of queue entries imposed by the host. A diagram illustrating determination of the host command queue status is illustrated in FIG. 3 and is further described below. If the determination results in a negative, the method 50 returns to operation 51, as a space in the host command queue 9 is available to accept a new host command. Recalling operations 53 and 54, a similar determination need not be made with respect to write commands due to the storing of the write command and the return of write acknowledgement, thereby freeing a space in the host command queue 9 for additional commands. In contrast, read commands remain pending in the host command queue 9 until executed. Therefore, a determination by the storage device 1 as to whether the host command queue 9 is full is indicative to whether the host command queue 9 is able to receive additional commands from the host 2.

If the determination of operation 56 is affirmative, method 50 proceeds to operation 57. In operation 57, the controller 10 forces the storage disk to complete a read command that is pending in the host command queue 9 (and consequently, also pending in the disk queue 21). Forcing or prioritizing completion of a pending read command from the host command queue 9 results in a position of the host command queue 9 being vacated, and thus becoming available to accept additional commands from the host 2. If a read command is not forced or prioritized as described according to the present disclosure, the read command would remain pending in the host command queue 9 until executed according to the read/write reordering scheme of the storage device 1. In such a manner, the pending read commands would continue to occupy the host command queue 9, preventing additional commands from being received by the host 2, and thereby reducing I/O throughput. As noted previously, execution of the read command may take a relatively long time, particularly if many write commands are pending in the disk queue 21 (thus decreasing the likelihood that a read command is the most efficient command to be executed next according to the read/write reordering scheme of the storage device 1). Once the forced or prioritized read command is executed and a space in the host command queue 9 becomes available, the method 50 returns to operation 51 and additional commands may be received from the host 2.

The forced or prioritized read commands of operation 57 may be selected in any manner. Since the host command queue 9 is full of read commands, the CPU 13 of the controller 10 has multiple options as to which read command is to be executed. For example, a read command may be selected for execution according to the location of the head 45, such as by executing a read command which minimizes the travel distance or travel time of the head 45 plus the rotational latency of the disk (i.e., a reordering scheme for only the commands in the host command queue). Alternatively, a command may be selected according to the length of pendency of the command, such as by selecting the longest pending command. Other methodologies are also contemplated.

In an alternative embodiment, it is contemplated that operation 56 may occur prior to operation 55. In such an example, operation 57 may occur prior to or after operation 56. In another embodiment, it is contemplated that operations 53 or 55 may occur prior to operation 52. Alternatively, operation 52 may be omitted, and any incoming command may be direction stored in the disk queue.

FIG. 3 is a diagram illustrating determination of host queue status, according to one embodiment. Specifically, FIG. 3 illustrates a state machine 60 for determining whether a host command queue is filled with read commands. According to the state machine 60, in one embodiment, read commands presently pending in the host command queue ("HostRdIOP") and write commands presently pending in the host command queue ("HostWrIOP") are summed ("HostIOP") in operation 61 to determine a maximum ("MAX") value presently in the host command queue. While FIG. 3 depicts HostIOP as the sum of HostRdIOP and HostWrIOP in operation 61, one of ordinary skill would understand that this depiction is simplified for clarity. Indeed, in one or more embodiments, other non-read/non-write commands in the host command queue may be added to generate the value of HostIOP during operation 61. Stated differently, in some embodiments, HostIOP may be equal to the sum of HostRdIOP, HostWrIOP and non-read/non-write commands in the host command queue. The HostIOP is compared to localMax (which is outputted from latch 63), and the maximum of those two values is outputted by comparator/selector 62, and latched into latch 63 at each clock-signal, newIO. That clock-signal is generated each time the storage device 1 receives a new command from the host and each time that the storage device 1 completes a command. Alternatively, the clock signal could be generated only each time the storage device 1 receives a new command from the host. With each additional new command ("newIO"), a "localMax" is generated in operation 63, which corresponds to the new "MAX" value.

On occasion, as dictated by the controller of the storage device 1, "resetIOCount" is triggered. Three things happen at that point: the value of "globalMax" is set equal to "localMax" in latch 64; latch 63 (which outputs "localMax") is reset to zero, and then "resetIOCount" is reset to zero. The "resetIOCount" signal can be generated by a counter (not shown) that is incremented each time a new command is added to the host queue, When the counter reaches a threshold value (for example, after 1024 commands have been added to the host queue), the "resetIOCount" signal is asserted, and the counter is reset. In another embodiment, the counter could be incremented each time a command is added to the host queue and each time a command is removed from the host queue (for example, because the command was completed). The occasional reset of "localMax" is particularly helpful for when the host changes the size of the host command queue, thus allowing the storage device 1 to determine the updated value and copy it to "globalMax" upon the next reset. The values of localMax and globalMax are compared by comparator/selector 65, which outputs the maximum of those two values Finally, in operation 56, "maxQD" is compared to "HostRdIOP". "maxQD" might not be equal to "globalMax". For example, if (after the most recent resetIOCount signal) and the Host queue-depth rises, "localMax" may be greater than "globalMax" (until the next "resetIOCount" signal).

If "HostRdIOP" is equal to "maxQD", the host command queue is deemed to be full of read commands. It is to be noted that operation 56 in FIG. 3 may be same determination of operation 56 in FIG. 2. However, other methodologies are contemplated. Thus, as described in the foregoing, aspects of the present disclosure determine a maximum command queue depth of the host command queue over a period of time, and compare the maximum command queue depth to the number of read commands in the host command queue. On occasion, the maximum command queue depth is reset and recalculated.

In an alternative embodiment, it is contemplated that a host may provide a size of the host command queue to the storage device.

FIG. 4 illustrates an example of a disk queue 21, according to one embodiment. In the example of FIG. 2, the disk queue 21 is in a form of a table, and details of each command received from the host command queue 9 are stored in one of the entries (e.g., rows) of the command queue 21. The table could be implemented by an array, a linked-list, a binary tree, or by any of a number of methods known to one of skill in the art. Typically, the received commands are stored in an ascending order of the entry. In some embodiments, the commands may be stored in order of increasing starting LBA, in groups of commands that have start LBA within specific limits, in order of increasing angular location of the associated data on the disk, or by any of a number of methods known to one of skill in the art. Each command indicates a start LBA, a length, and a type of the command, and these data are stored in each entry of the disk queue 21. The data associated with each command may include other information (for example, information that can be used to specify the physical location of the data on the disk). The "start LBA" is a leading logical address (logical location) of a logical address range to be accessed in accordance with the command, and the length is a length of data to be accessed in accordance with the command. Read/Write indicates a type of the command, and the type includes "read" and "write," which correspond to a read command and a write command, respectively, in the present embodiment. Each time a new command is received from the host 2 through the I/F circuit 11, the CPU 13 updates the disk queue 21. It is to be understood that the illustrated disk queue 21 is only representative. Other configurations are also contemplated.

FIG. 5 illustrates an example of a host command queue 9, according to one embodiment. The host command queue 9 is similar to the disk command queue 21, however, the host command queue 9 is controlled by the host 2, and generally stores fewer entries than the disk queue 9. In the illustrated example, the host command queue 9 is capable of storing eight entries, five of which are occupied by pending read commands. It is to be noted that the host command queue 9 may hold more than eight entries, and that a maximum number of entries that the host command queue may hold can vary during operation, as dictated by the host. In addition, while the occupied entries of the of host command queue 9 reflect the same index location in both the host command queue 9 and the disk queue 21, such a configuration need not always, but may, occur. Furthermore, it is to be noted that the occupied entries of the host command queue 9 are read commands. As discussed above, read commands generally are pending in the host command queue 9 longer than write commands, which are generally stored in the disk queue 21 and then removed from the host command queue 9 upon delivery of a write acknowledgement to the host 2. In some embodiments, the number of commands pending in the host command queue 9 is an order of magnitude or more smaller than the number of commands pending in the disk command queue 21. For this reason, it is contemplated that the storage device 1 may consider all commands pending in the host command queue for implementing aspects of the disclosure, including determining which command to force execute.

While the foregoing is directed to embodiments of the present disclosure, other and further embodiments of the disclosure may be devised without departing from the basic scope thereof, and the scope thereof is determined by the claims that follow.

We claim:

1. A storage device, comprising:
   a disk;
   a head configured to write data to and read data from the disk; and
   a controller configured to:
   receive from a host a read command in a host command queue;
   store the read command in a disk queue;
   determine the lesser of (1) a limit of host command queue entries imposed by the storage device and (2) a limit of host command queue entries imposed by the host, as the limit of host command queue entries;
   determine whether the host command queue is full of pending read commands, including the received read command, based on the determined limit; and
   if the host command queue is full of pending read commands, force execution of one of the pending read commands.

2. The storage device of claim 1, wherein the controller is configured to, if the host command queue is not full of pending read commands, receive an additional command in the host command queue.

3. The storage device of claim 1, wherein the controller is further configured to select the pending read command to be force executed based on a head position of the storage device.

4. The storage device of claim 1, wherein the controller is further configured to select the pending read command to be force executed based on a pendency of the read commands.

5. The storage device of claim 4, wherein the controller is configured to select the pending read command to be force executed that has a longest pendency of the pending read commands.

6. The storage device of claim 1, wherein the host command queue is able to hold less entries than the disk queue.

7. A method of operating a storage device, comprising:
   receiving from a host a read command in a host command queue;
   storing the read command in a disk queue;
   determining the lesser of (1) a limit of host command queue entries imposed by the storage device and (2) a limit of host command queue entries imposed by the host, as the limit of host command queue entries;
   determine whether the host command queue is full of pending read commands, including the received read command, based on the determined limit; and
   if the host command queue is full of pending read commands, forcing execution of one of the pending read commands.

8. The method of claim 7, if the host command queue is not full of pending read commands, then receiving an additional command in the host command queue.

9. The method of claim 7, wherein the pending read command that is forced to be executed is selected based on a head position of the storage device.

10. The method of claim 7, wherein the pending read command that is forced to be executed is selected based on pendency of the read commands.

11. The method of claim 10, wherein the pending read command that is forced to be executed has a longest pendency of the pending read commands.

12. The method of claim 7, wherein the host command queue is able to hold less entries than the disk queue.

* * * * *